Jan. 10, 1956  M. J. MERRICK  2,730,024
PORTRAIT ATTACHMENT FOR STEREOSCOPIC CAMERAS
Filed Nov. 7, 1952  2 Sheets-Sheet 1

INVENTOR.
MAURICE J. MERRICK
BY
Buckhorn and Cheatham
ATTORNEYS

Jan. 10, 1956 M. J. MERRICK 2,730,024
PORTRAIT ATTACHMENT FOR STEREOSCOPIC CAMERAS
Filed Nov. 7, 1952 2 Sheets-Sheet 2
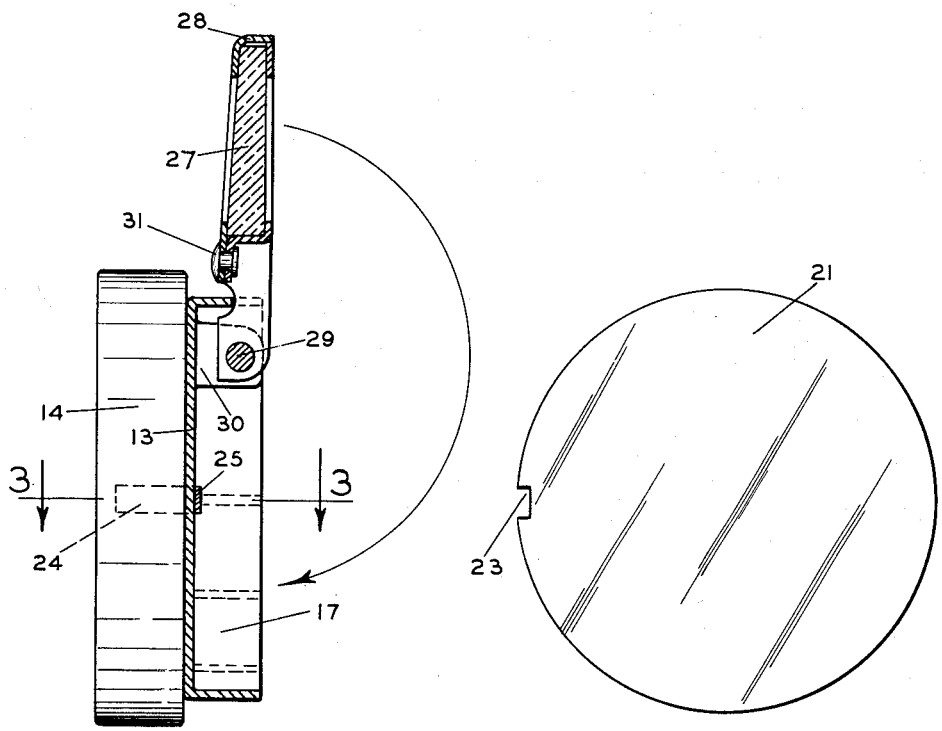
Fig. 4
Fig. 5
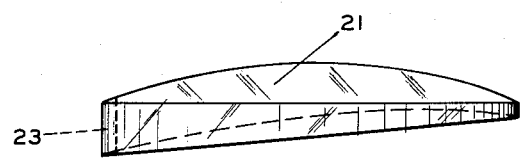
Fig. 6
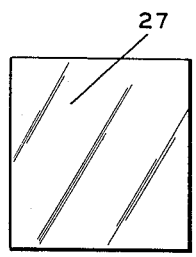
Fig. 7
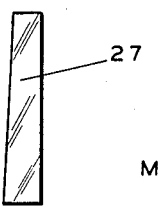
Fig. 8
INVENTOR.
MAURICE J. MERRICK
BY Buckhorn and Cheatham
ATTORNEYS

United States Patent Office 2,730,024
Patented Jan. 10, 1956

2,730,024

PORTRAIT ATTACHMENT FOR STEREOSCOPIC CAMERAS

Maurice J. Merrick, Portland, Oreg., assignor to Sawyer's Inc., Portland, Oreg., a corporation of Oregon Application November 7, 1952, Serial No. 319,371

2 Claims. (Cl. 95—18)

My present invention comprises a close-up attachment for stereoscopic cameras, the invention having for its object the provision of means whereby stereoscopic portraits or photographs showing details of objects may be made.

It is an established principle of photography that with a fixed focus camera, or an adjustable focus camera in which the lenses are mechanically arranged so as to be incapable of moving far enough to bring near objects into focus, clear portraits or photographs of near objects may be obtained by mounting a relatively long focus lens in front of the objective lens of the camera. This supplementary, long-range lens is so designed that when optically registered with the objective lenses or lens of the camera, it converts the camera into a portrait or close-up camera by making its effective focal length shorter. For example, a stereoscopic camera having fixed focus lenses which are focused sharply at eighteen feet, will clearly register all objects from nine feet to infinity in sharp focus, with sufficient sharpness being obtained for objects as close as five or six feet from the camera. However, if it is desired to photograph closer objects, a supplementary lens may be mounted in front of each of the objective lenses which will correct the effective focal length of the lens systems to clearly and sharply register all objects at much shorter distances. In a stereoscopic camera, however, it is not enough to correct the focal length of the lenses. When using a stereoscopic camera having the normal fixed focus length of eighteen feet mentioned above, and photographing objects closer than about fifty-four inches with the use of an ordinary close-up lens, I have found that the rays of light originating in the object and passing through the combined lenses are disposed at such an obtuse angle with respect to each other that parts of the objects fail to register on the film. In other words, except for minor corrections built into the camera, the lenses are designed to take rays of light from a point eighteen feet distant and bend the rays parallel to the axis of the camera. When close-up shots are taken, the line from the object through the center of the lens is at such a large angle to the axis of the camera that the ray of light misses the center of the film. The result is that part of the object is recorded in common on the two pictures, but a portion of one side of the object falls outside of one film on one side, and a portion of the other side of the object misses the other film on the other side. I have corrected this by placing in front of each camera lens a prism lens so calculated as to bring the center of the ray into the center of the picture. These prism lenses are placed in front of the objective lenses of the camera with their thicker parts toward the axis of the camera. This may be done by having a symmetrical lens paired with a prism lens, but it is much more satisfactory and economical to provide a long-range portrait lens having a prism incorporated therein so that one lens does the job of both. The prism lenses are so calculated that they may be made available in any one of several ranges and may be marked with the depth of field which they are capable of covering.

Accordingly, an object of the present invention is to provide inexpensive means for adapting a stereoscopic camera for portrait or close-up photography.

A further object of the present invention is to provide an attachment of the foregoing character with supplementary prism range finder lens means whereby the photographer may be enabled to train the camera lenses exactly upon the object he desired to photograph. For example, the line of sight of the range finder of the above-mentioned camera is parallel to the central axis of the camera so that, in effect, it, as well as the lenses, are arranged along parallel axes. In photographing an object at very close distances there will be sufficient parallax between this line of sight and the rays through the lenses from the object that poor composition, or inability clearly to photograph the part which it is desired to depict may result. Accordingly, an object of the present invention is to provide an attachment of the foregoing character with a supplementary range finder lens so correlated to the prism lenses that the line of sight through it will intersect the intersection of rays of light falling upon the centers of the picture frames and emanating from a small object upon which the camera is trained. A further object of the present invention is to provide an attachment of the foregoing character in which the view finder lens may be folded into the frame of the attachment whereby to provide a small, compact article which may be protected in a small case.

The objects and advantages of the present invention may be more readily understood by reference to the accompanying drawings wherein like numerals refer to like parts throughout, taken in connection with the following specification.

In the drawings,—

Fig. 4 is a vertical section taken substantially along the plane of the line 4—4 of Fig. 2;

Fig. 5 is a front view of the close-up prism lens;

Fig. 6 is a side view of the close-up prism lens;

Fig. 7 is a front view of the supplementary view finder lens; and

Fig. 8 is a side view of the supplementary view finder lens.

Figure 1:
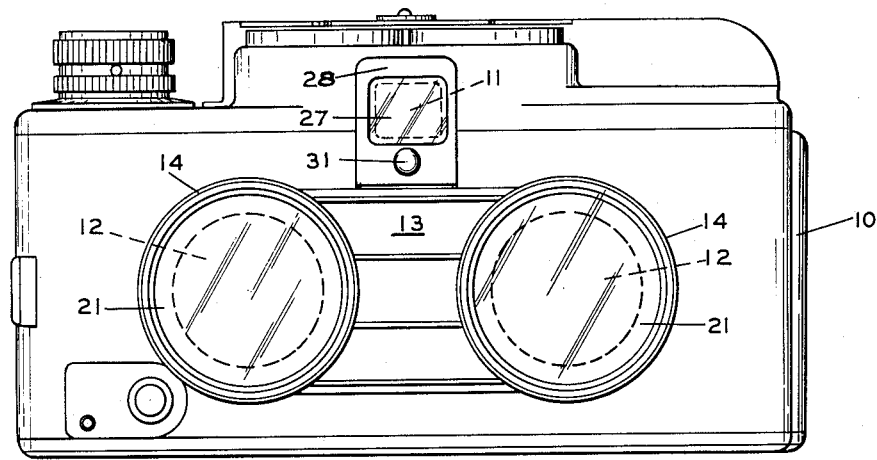
Fig. 1 is a front view of a stereoscopic camera having the present invention mounted thereon.
Figure 2:
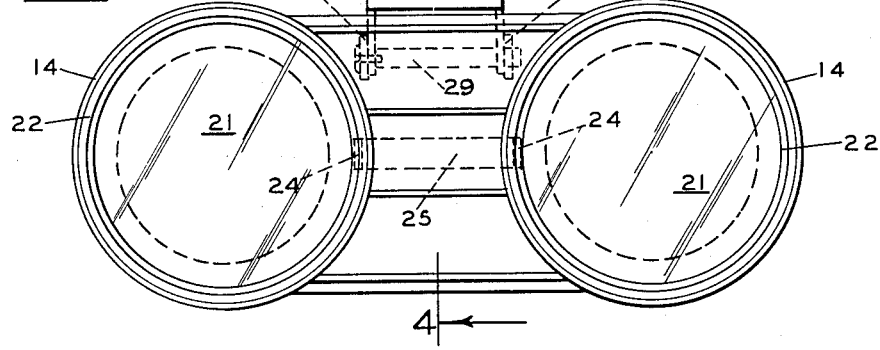
Fig. 2 is a front view, on an enlarged scale, of the present invention.
Figure 3:
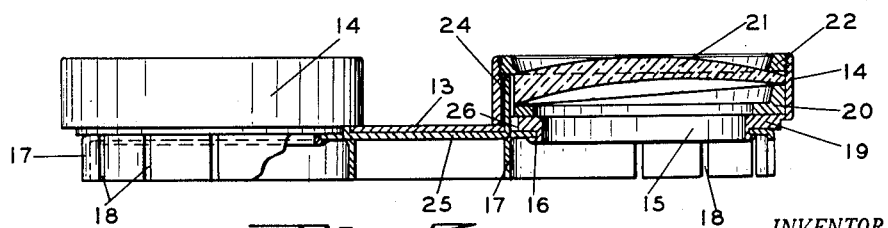
Fig. 3 is a top view of the present invention, with parts broken away, substantially along the line 3—3 of Fig. 4.

The invention is illustrated in Fig. 1 as mounted upon a fixed focus, stereoscopic camera as illustrated and described in the copending application of Gordon N. Smith, Serial No. 171,863, filed July 3, 1950, now Patent No. 2,680,400, but it is to be appreciated that the invention could likewise be mounted upon an adjustable focus, stereoscopic camera such as disclosed in the patent to Smith, No. 2,527,106, issued October 24, 1950. Both of the cameras disclosed in the patent and application mentioned above are provided with objective lens means including forwardly projecting, cylindrical flanges surrounding the lens means, principally for the purpose of providing means for mounting detachable haze filters or the like. The present invention readily adapts itself to such cameras since the cylindrical flanges surrounding the objective lenses are utilized to mount the portrait attachment on the camera, the attachment being provided with cylindrical friction flanges for embracing the projecting flanges on the camera. The camera herein illustrated is indicated by the numeral 10 and comprises a view finder including a forwardly located window 11 and a pair of objective lenses indicated at 12, it being unnecessary to describe any other portion of the camera for the purposes of the present invention.

The present invention comprises a frame, which may be conveniently stamped or molded, the frame comprising a central bridge portion 13, integrally connected to a pair of lens holder means 14. Each of the lens holder means is provided with a central opening 15 adapted to register with the lens openings of the camera. The opening 15 is surrounded by a cylindrical lip indicated at 16 which may be spun to lock the lip over the inner end of a mounting flange 17 adapted to embrace the cylindrical flange projecting forwardly around each of the camera lenses. Preferably, the mounting flange 17 is provided with a plurality of longitudinal slits 18 whereby the flange may be expanded to permit firm frictional engagement with the flanges on the camera, and to eliminate the necessity for accurately machining the attachment.

Each of the lens mounting means comprises a shoulder portion 19 upon which is seated a beveled lens seating member 20, and a prism lens 21 is held on the lens seating member by a threaded bezel 22. The prism lens 21 is a concavo-convex prism lens, and the arrangement is such that the convex surface is maintained in the surface of a sphere having its center along the axis of the lens holder 14. The inclined seating member 20 tapers toward the opposite lens holder so that the thicker portion of the lens 21 is maintained toward the center of the attachment. In order to maintain the thickest portion of the lens 21 exactly along a line drawn through the centers of the pair of lenses, the edge of the lens is provided with a notch indicated at 23 and a locating member 24 disposed within the lens holder along the transverse axis of the attachment engages the notch 23 to maintain the lens in proper position. The locating members 24 may comprise the opposed ends of a U-shaped strap 25, the body of which is fastened to the inner surface of the bridge portion 13, the portions 19 being provided with openings 26 to permit the member 24 to project forwardly into cooperating engagement with the lenses.

In order to correct parallax of the line of sight through the view finder of the camera, a supplementary view finder prism lens 27 is mounted in a holder 28 which is pivotally supported by a transverse pivot 29 journaled in brackets 30 fixed to the upper rear surface of the bridge portion 13. The supplementary view finder lens is a prism having its thicker portion located lowermost whereby the line of sight therethrough will be directed downwardly to intersect the axis of the camera at the close-up point of intersection of the corrected object rays. As clearly seen in Fig. 4, the view finder holder 28 comprises a pair of sheet metal stampings secured together by means of a rivet 31. This figure also illustrates the fact that the bridge portion 13 is flanged along its upper and lower edges and the supplementary view finder lens may be swung downwardly and nested between the mounting flanges 17 when not in use, the upper flange being recessed to permit upward movement of the lens to a vertical position in front of the view finder.

Having illustrated and described a preferred embodiment of my invention, it should be apparent to those skilled in the art that the same permits of modification in arrangement and detail. I claim as my invention all such modifications as come within the true spirit and scope of the appended claims.

I claim:

1. A close-up attachment for use with a stereoscopic camera having a pair of objective lenses surrounded by projecting annular flanges and a view finder disposed centrally between and above said objective lenses, comprising a frame, a pair of prism lenses, said prism lenses being of longer focal length than the objective lenses of the camera, lens mounting means on said frame to mount said prism lenses in said frame at the same spacing as the spacing of the objective lenses of the camera, a pair of annular friction flanges on said frame adapted to embrace the projecting flanges of the camera whereby to maintain said prism lenses in front of the objective lenses of the camera in order to effect shortening of the effective focal length of the camera, cooperative means on said prism lenses and said frame to maintain the thicker portions of said prism lenses toward each other with each prism lens symmetrically disposed with respect to a line through the centers thereof, a supplementary view finder lens holder pivotally mounted on said frame for movement about a pivotal axis parallel to said line between an operative position and a retracted position wherein said lens holder is nested between said friction flanges, a supplementary view finder lens mounted in said supplementary view finder lens holder in position to register with the view finder of the camera when said holder is in said operative position, said supplementary view finder lens comprising a prism having its thickest portion lowermost, said prism lenses bearing such optical relation to the lenses of the camera that beams of light originating from a point relatively close to the camera along the optical axis of the camera are directed in parallel relation after passing through the prism lenses and the camera lenses so as to permit close-up stereoscopic photography, and said supplementary view finder lens bearing such relation to said prism lenses that the line of sight therethrough is directed at said point.

2. A close-up attachment for use with a stereoscopic camera having a pair of objective lenses and a view finder disposed centrally between and above said objective lenses, comprising a frame, a pair of prism lenses, said prism lenses being of longer focal length than the objective lenses of the camera, lens mounting means on said frame to mount said prism lenses in said frame at the same spacing as the spacing of the objective lenses of the camera, flanges on said frame adapted to engage portions of the camera to position said prism lenses in front of the objective lenses of the camera in order to effect shortening of the effective focal length of the camera, cooperative means on said prism lenses and said frame to maintain the thicker portions of said prism lenses toward each other with each prism lens symmetrically disposed with respect to a line through the centers thereof, a supplementary view finder lens holder pivotally mounted on said frame for movement about a pivotal axis parallel to said line between an operative position and a retracted position wherein said lens holder is nested between the flanges on said frame, a supplementary view finder lens mounted in said supplementary view finder lens holder in position to register with the view finder of the camera when said holder is in its operative position, said supplementary view finder lens comprising a prism having its thickest portion lowermost, said prism lenses bearing such optical relation to the lenses of the camera that beams of light originating from a point relatively close to the camera along the optial axis of the camera are directed in parallel relation after passing through the prism lenses and the camera lenses so as to permit close-up stereoscopic photography, and said supplementary view finder lens bearing such relation to said prism lenses that the line of sight therethrough is directed at said point.

References Cited in the file of this patent

UNITED STATES PATENTS

| Number | Name | Date |
|---|---|---|
| 1,319,762 | Decuir | Oct. 28, 1919 |
| 1,498,177 | Leonard | June 17, 1924 |
| 2,267,952 | Sauer | Dec. 30, 1941 |
| 2,360,322 | Harrison | Oct. 17, 1944 |
| 2,453,075 | Land | Nov. 2, 1948 |
| 2,607,275 | Peterson | Aug. 19, 1952 |

OTHER REFERENCES

Serial No. 353,931, Laubman (A. P. C.), published May 4, 1943.